Patented June 11, 1935

2,004,110

UNITED STATES PATENT OFFICE 2,004,110

POROUS RUBBERIZED FABRIC AND METHOD OF PRODUCING SAME

Percy Herbert Head, Attenborough, England, assignor to Xetal Products Limited, Long Eaton, near Nottingham, England No Drawing. Application February 14, 1934, Serial No. 711,279. In Great Britain September 14, 1933

3 Claims. (Cl. 154—40)

This invention comprises improvements in porous rubberized fabrics and in methods of producing same and has for its principal object the production of fabrics of this kind which are particularly applicable for use for articles of clothing such as corsets, brassières and the like.

Accordingly the present invention provides a method of producing a composite elastic and porous rubberized fabric which consists in spraying the surface of at least two pieces of fabric with vulcanizing rubber latex, placing the fabric pieces face to face with the surfaces to which the rubber latex has been applied in contact and uniting the fabric pieces by the application of pressure thereto.

It will thus be seen that when the completed fabric is used for articles of clothing the rubber cannot come into contact with the flesh of the wearer and furthermore the various laminations may be of different materials and/or of varying colours.

In carrying the present invention into effect two stretchable pieces of fabric, and more particularly but not necessarily knitted fabric, are sprayed, preferably while under a suitable degree of tension, with rubber latex of any known vulcanizing type but preferably of 50% to 60% concentration, and united by the application of pressure also preferably while under tension.

By the expression "vulcanizing rubber latex" is meant either a latex of a pre-vulcanized or self-curing type capable of being vulcanized at normal temperature and atmospheric pressure, or a latex of which the rubber deposit may be vulcanized by subjecting same to suitable heat.

A suitable mix for the treatment is as follows:—

To a 60% solution of stabilized rubber latex add zinc oxide, zinc diethyldithiocarbamate and sulphur (preferably in colloidal form) in the proportions of 5%, 1% and 2.5% respectively of the dry rubber contents of the said solution.

This mix is, however, only given as an example as it is to be understood that any suitable ultra-accelerator may be employed, while it is also possible to add other ingredients such as dyes or fillers to the above or similar mixture and still retain the desired elasticity of the rubber deposit. Moreover, the mixture may be diluted with water which for particular purposes may be made slightly alkaline with liquid ammonia preferably .880 specific gravity and preferably not exceeding 2%.

Immediately after the pieces of fabric have been sprayed they are placed face to face with the two faces on which the latex has been deposited in contact with one another and whilst the latex is still wet or tacky and the fabric is maintained under suitable tension a light pressure of say 5 to 10 lbs. per square inch is applied to the composite fabric. This pressure is sufficient to unite the two pieces of treated fabric, and it may here be stated that when too great a pressure is employed globules of latex are forced through the fabric which destroy or tend to destroy the porosity and appearance of the completed fabric.

Subsequent to the foregoing treatment the laminated fabric thus formed is submitted to heat by being passed over heated rollers or into a heated atmosphere, for vulcanizing the latex. If a mix of the type previously named is used the heat treatment may be for approximately half an hour at approximately 100° C., or for approximately one hour at approximately 90° C.; the time and temperature depending on circumstances.

If desired however this heat treatment may be obviated by employing a pre-vulcanized or self-curing latex for uniting the pieces of fabric.

After the latex has been vulcanized the laminated fabric may be subjected to heat and/or pressure without in any way deleteriously affecting the porosity of the composite fabric, providing always that the temperature and/or pressure to which the laminated fabric is subjected is not sufficient to affect the base fabric itself.

It will of course be appreciated that if desired three pieces of fabric may be united by means of two intermediate layers of rubber latex or that the number of layers of fabric may be increased as required.

Turning now to the question of porosity, this is maintained, because the base fabric is tensioned or stretched during the union of the textile fabrics and/or of the application of the latex to one of the faces thereof, because the latex is applied in the form of a more or less fine mist and does not penetrate the fabric, and because pressure to unite the textile pieces into a compound or laminated fabric is applied to the stretched fabric while wet, and while under tension.

The fabric is preferably stretched in a direction at right angles to the direction of the stitch wales. The amount of stretch is advantageously approximately two thirds or three quarters of the maximum stretch than can be imparted to the fabric, and a certain degree of stretch is maintained permanent in the fabric after treatment.

I have discovered that if a stretchable fabric, such as a knitted fabric, is treated with a rubber latex as described, while stretching to an extent less than the permissible stretch incident to the nature of the fabric, the latex will, upon setting, maintain the goods in stretched condition. Thus, if a knitted fabric is being treated and is stretched transversely of the wales thereof to an extent somewhat less than the total permissible stretch, and is maintained in this stretched condition, when the latex sets the resulting fabric maintains a certain amount of stretch transversely of the wales; and if now further tension be applied to the goods made up of such treated fabric, as in the use thereof, in a direction transverse to the wales, the goods will yield and stretch because the stretch during treatment with the latex is only partial and the rubber deposit yields and will stretch with said further stretching of the goods. Again, if the goods be subjected to a tension in the direction of the wales it will stretch in this direction also, since the knitted loops will then be pulled back to their original, normal position, or approximately so, by this stretching of the goods in the direction of the wales, a corresponding contraction transversely of the wales taking place. Thus by the method of producing the complete fabric which has been described, there is produced a goods or composite fabric which is porous, rubberized, having fabric-exposed surfaces and with the capacity of freely stretching both transversely and longitudinally.

As has already been pointed out, the production of a laminated goods, with fabric material exterior surfaces and a uniting rubber interior and stretchable as described, which is highly porous—substantially as porous as are the textile fabrics employed and little, if at all, diminished in this respect by reason of the application of the rubber constituent—is one of the very important features of the present invention; and this feature, which I believe to be new in the art, is attained by spraying the rubber latex upon the surface or surfaces of the textile fabric or fabrics employed in the form of a mist, which does not imperviously coat such fabric but leaves it porous, though carrying sufficient rubber for the purposes already stated.

The treatment of the fabric may be either intermittent or continuous. For example, comparatively small pieces can be individually treated while being held in a stretched condition in a suitable frame or the like. Alternatively, in dealing with comparatively long pieces of fabric same may be taken from a roll or other supply and intermittently traversed under suitable tension so as to bring successive portions of the fabric into position for spraying, at which position the fabric is stretched at right angles to the direction of traverse by parallelly disposed gripping and stretching members. Two pieces or lengths of fabric so stretched and sprayed are superimposed and lightly pressed together while under tension by calendering rollers or otherwise while wet or tacky. The treatment of fabric lengths may, however, be accomplished while the fabric is being continuously traversed.

Preferably the latex is applied to the fabric through the medium of pressure guns which are positioned a suitable distance therefrom, say from three to four feet away from the fabric. The cross sectional diameter of the nozzles of the guns is as small as conveniently possible for example $\frac{1}{16}$ inch and the pressure is preferably in the neighborhood of 35 lbs. per square inch.

If conditions permit the latexing process may, as aforesaid, be continuous; the base fabrics being traversed in front of the latex guns and being thereafter united by the application of light pressure as previously described.

I claim:—

1. The herein described method of producing a porous laminated fabric, which consists in applying to a surface of a textile fabric, which is stretchable under tension to a much greater extent in one direction than it is in a direction transverse thereto, a rubber latex in the form of a fine spray, allowing said latex to set while the fabric is under tension and stretched in the direction of its greatest extensibility, but to an extent less than its permissible stretch, superposing the same upon another piece of stretchable fabric with the latex between them, and finally pressing the said pieces together, the latex serving to unite them and maintain the fabric stretched as described, without substantially reducing the porosity of the laminated fabric produced, such finished fabric being stretchable in dual directions and having exposed textile surfaces and rubber interior.

2. The method stated in claim 1, when the second named fabric is of like stretchable nature to the first named fabric, is likewise stretched and has applied to one of its surfaces rubber latex in the form of a fine spray, the two latex-carrying surfaces of the fabrics being in contact when the pieces are pressed together and united.

3. A highly porous laminated fabric, composed of a plurality of pieces of knitted fabrics united together by the direct deposit of solids of a rubber latex, applied to surfaces of the fabric, the pieces of material being maintained in a stretched condition in one direction—but less than the permissible stretch of such pieces—by the said deposit, and the said laminated fabric being porous and capable of stretching under tension applied thereto in one direction and also of stretching under tension applied thereto in directions at right angles to said one direction.

PERCY HERBERT HEAD.